Patented Apr. 12, 1938

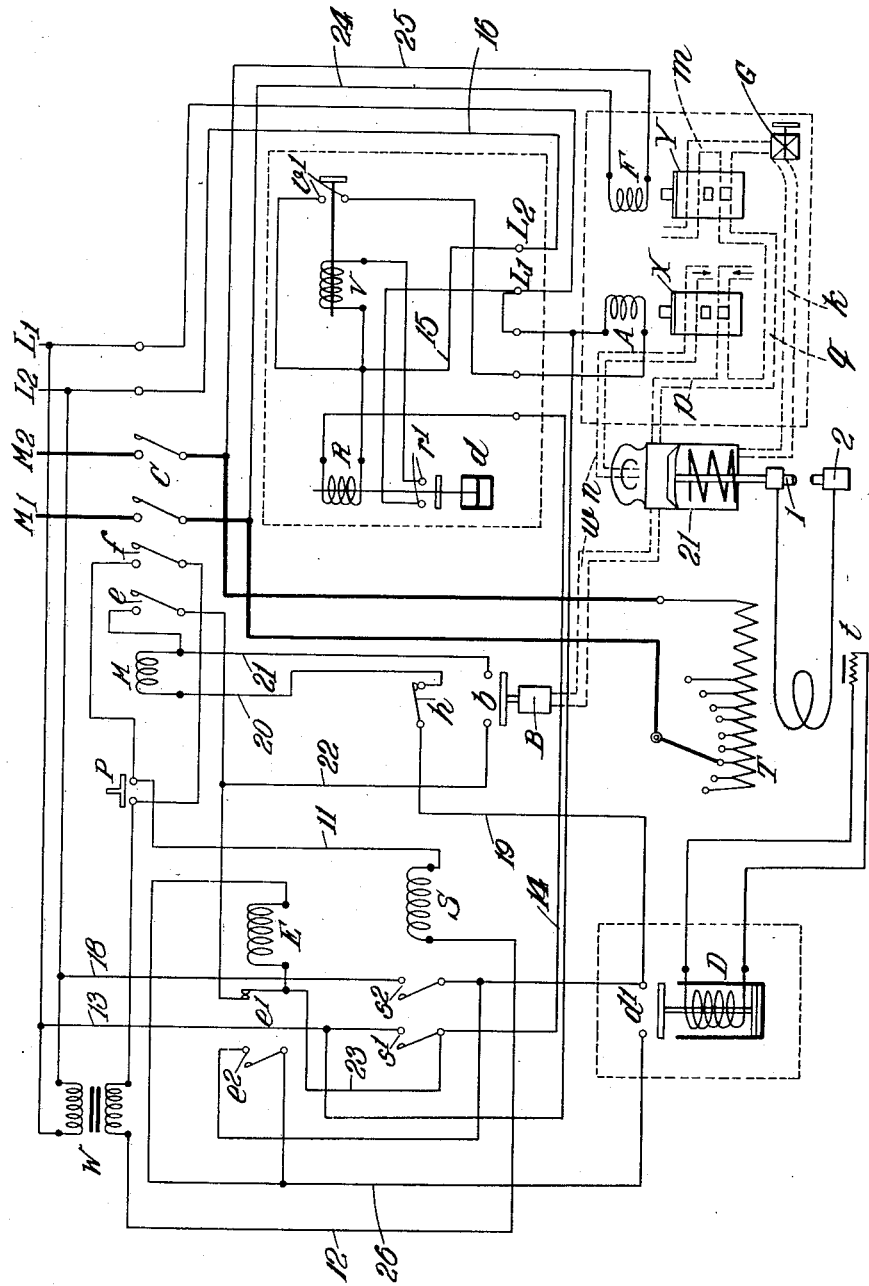

2,113,664

UNITED STATES PATENT OFFICE 2,113,664

WELDING

Walter Stewart Simmie, Oxford, England, assignor to Pressed Steel Company Limited, Cowley, Oxford, Oxfordshire, England, a British company Application November 21, 1936, Serial No. 112,028
In Great Britain November 25, 1935

5 Claims. (Cl. 219—4)

The present invention relates to a welding system and concerns particularly a method for controlling the operation of fluid operated electric resistance welding machines. The object of the invention is to provide means whereby the welding pressure is controlled independently of the operator and the flow of welding current.

According to the invention in electric resistance welding machines, the electrodes of which are brought together by fluid pressure, there is provided a valve controlling the application of fluid pressure which valve is actuated on initiation of a welding cycle to bring the electrodes together and to hold them in operated position independently of the flow of welding current.

According to another feature of the invention in an electric resistance welding system in which the electrodes are brought together by fluid pressure, the pressure is so controlled that when the welding current flows the pressure on the electrodes is reduced, and on cessation of the welding current the pressure on the electrodes is restored to its original value.

Connected in the fluid inlet line of, for example, a portable welding machine is a valve under the control of the operator, which valve operates on initiation of a welding cycle, to bring the electrodes together, to create a reduced pressure on the electrodes during the actual passage of welding current and, on cessation of the welding current, to permit heavy pressure to be applied to the electrodes after the weld has been completed.

The application of welding current may be controlled by any known timing device which controls the closing of a contactor or like switch, On initiation of a welding cycle the valve is actuated firstly to bring the electrodes together and to hold them in that position and then to effect the closure of the main welding contactor whereupon an auxiliary valve is operated to bring about a reduction of fluid pressure on the electrodes for the duration of flow of welding current and on cessation thereof permits the restoration of the fluid pressure to its original value.

The accompanying drawing, which is a circuit diagram, shows one method of carrying the invention into effect.

On pressure of the thumb switch P the start relay S is energized from the step-down transformer W connected across the lines L1 and L2 over the conductors 11 and 12. Relay S energizes and completes the circuit over contact s1, for relay R, from line L1, conductor 13 contact s1 conductor 14, relay R, conductor 15, conductor 16 to line L2, relay R energizes in turn and closes contacts r1, controlled by a dash pot d, and energizes the relay V. Relay V, at contacts v1, energizes the relay A of the main air valve X. Air valve X is actuated and air passes into the cylinder of the welding gun 21 through the line p, the pressure builds up and brings the electrodes 1 and 2 together; leakage of air over the line w brings in the air switch B which completes the circuit over the contacts of a normally closed safety switch h to the coil M of the main contactor C; the circuit for coil M may be traced as follows: Line L2, conductor 18, contact s2 of relay S, conductor 19, contacts h, conductor 20, coil M, conductor 21, contacts b, conductor 22, normally closed contacts e1 of relay E, conductor 23, contacts S1, conductor 13 to line L1. The contactor C operates to connect the welding transformer T across the mains M1 and M2. Simultaneously a locking circuit for the coil M is completed over the contacts e which are auxiliary contacts of the main contactor C and are operated simultaneously therewith. At the same time the circuit over the push button switch P is maintained over auxiliary contacts f of the main contactor C so that the circuit is not interrupted after the push button P is released. On closure of the main contacts of the contactor C the relay F energizes over the conductors 24 and 25 and operates the auxiliary air valve Y which connects the air inlet p over the line q through a pressure throttle valve G over the line k to the bottom of the air cylinder 21 of the gun, relay F at the same time closing the exhaust line m from the line q. Passage of air over the lines q and k reduces the pressure at the electrodes 1 and 2 for the actual weld. Immediately the welding current flows the transformer t energizes and picks up the time delay relay D which completes the circuit for the relay E across the contacts d1, the circuit for relay E being traced from line L1, conductor 13, contacts s1, relay E conductor 26, contacts d1 contacts s2, conductor 18 back to line L2. Relay E energizes completing a locking circuit for itself at contacts e2 and at contacts e1 opens the circuit to the contactor coil M, contactor C thereupon falls away breaking the circuit for the relay F whereupon air valve Y falls away to close the line q and pressure then builds up again over the line p in the upper end of the cylinder 21 of the gun. During this time the air in the bottom of the cylinder 21 exhausts over lines k and m, whilst the air outlet line n is closed by the air valve X. Whilst the above mentioned operations have been taking place the dash pot d controlling the contacts r1 of the relay R has maintained closed the circuit of the relay V which in turn holds the relay A energized for a predetermined time depending on the delay of dash pot d. When the contacts r1 open, relay V de-energizes and at contacts v1 interrupts the circuit of the coil A, consequently the air valve X falls back, closes the air inlet p and opens the air outlet line n from the top of the cylinder. The piston in the gun cylinder is returned under spring pressure.

By means of the foregoing, the electrodes are first brought together, and located on the work to be welded, at a predetermined pressure. As soon as the current flows, the pressure on the electrodes is reduced, and at the conclusion of the weld, the time of which may be determined in any known manner, the pressure on the electrodes is increased, before falling away in readiness for the next weld.

Obviously different conditions of application of the first pressure, the actual welding pressure and the recompression pressure can be obtained by means of the throttle valve G and throughout each welding cycle the electrodes are held together under pressure, irrespective of the duration of the flow of welding current and the release of the operator's control switch.

I claim:

1. In an electric resistance welding system, means for bringing the electrodes together under a given initial pressure higher than welding pressure, means operable upon the application of said given initial pressure to close the welding circuit, means responsive to the flow of welding current in said circuit to reduce the pressure to a given relatively lower welding pressure, and means operable upon cessation of welding current to increase the pressure to substantially the said initial value.

2. In an electric resistance welding system, a pair of welding electrodes, fluid operated pressure means for bringing the electrodes together under pressure, a pressure control valve for said pressure means, a time delay control relay for said valve, a welding circuit, means operable in response to operation of said pressure means to initiate closure of the welding circuit, means responsive to the flow of current in the welding circuit to reduce the pressure exerted by said pressure means and means operable in response to cessation of flow of current in the welding circuit to increase the pressure exerted by the electrodes.

3. In an electric resistance welding system, a pair of welding electrodes, a fluid pressure device for bringing the electrodes together under pressure, a welding circuit including said electrodes, a normally open fluid pressure actuated main contactor switch for closing and opening the welding circuit, a control valve for said fluid pressure device operable upon actuation to admit operating fluid under pressure to the fluid pressure device and to said fluid pressure actuated contactor, an auxiliary control valve for said pressure device operable to effect reduction of pressure exerted by said pressure device, and actuating means for said auxiliary valve operable only during closure of the welding circuit.

4. In an electric resistance welding system, a pair of welding electrodes, a fluid pressure device for bringing the electrodes together under pressure, a welding circuit including said electrodes, a normally open fluid pressure actuated main switch for closing and opening the welding circuit, an electro-magnetic air valve operable to admit operating fluid to said pressure device to exert a given maximum pressure on said electrodes and to said main switch to move the latter into circuit closing position, a slow-to-release relay for said electro-magnetic valve, an auxiliary electro-magnetic valve arranged to be energized during closure of the welding circuit and operable during energization to effect operation of said fluid pressure means at reduced pressure, said slow-to-release relay being adjusted to maintain operation of said first named electro-magnetic air valve for a given time after opening of the welding circuit.

5. In an electric resistance welding system, a pair of welding electrodes, a fluid actuated piston for bringing the electrodes together under pressure, an electro-magnetic valve operable to admit ful working pressure to the back of said piston to admit effective application of full pressure to the electrodes, an auxiliary electro-magnetic valve operable upon energization to admit counter pressure to the front of said piston to effect a reduction of the pressure applied to the electrodes, a welding circuit including said electrodes, a normally open fluid pressure actuated switch in said welding circuit actuated by back pressure from the back of said piston, a time delay control relay for said first mentioned valve, and a control relay for said auxiliary valve arranged to be energized only during energization of said welding circuit.

WALTER STEWART SIMMIE.